3,341,555
STABLE LIQUID DICARBOXYLIC ACID ANHYDRIDE COMPOSITIONS
George S. Wooster, Hamburg, and Aloysius J. Kane, Buffalo, N.Y., assignors to Allied Chemical Corporation, New York, N.Y., a corporation of New York
No Drawing. Filed Sept. 30, 1965, Ser. No. 491,888
11 Claims. (Cl. 260—346.3)

This invention relates to compositions of matter. It relates more particularly to stable homogeneous liquid compositions comprising cyclic dicarboxylic acid anhydrides and especially to such stable homogeneous liquid compositions which are particularly adapted for curing and resinifying polyepoxides and glycidyl polyethers of polyhydric phenols and polyhydric alcohols.

Polyepoxides and glycidyl polyethers of polyhydric phenols and polyhydric alcohols, otherwise known and hereafter referred to as "epoxy resins," are condensation products of organic vicinal epoxides with polyhydric phenols and polyhydric alcohols. They may be cured to form strong products of high molecular weight, by reaction with curing agents such as amines and organic acid anhydrides, and are widely employed as structural plastics, adhesives, molding resins, films and the like because of their high strength, resistance to chemicals, and strong adhesion properties.

Cyclic dicarboxylic anhydrides which are normally solid at room temperature (about 20–30° C.), such as phthalic anhydride and hydrogenated derivatives thereof (e.g. tetrahydrophthalic anhydride and hexahydrophthalic anhydride) and anhydride mixtures containing them, are effective curing and hardening agents to convert epoxy resins to resinous structures and other useful products having properties which are quite superior to similar products obtained using anhydride curing agents which are normally liquid at about 20 to 30° C.

It is known that the efficiency of anhydrides for curing epoxy resins is greatly enhanced by the addition of certain accelerators, notably amine compounds. While solutions of amine accelerators in anhydrides which are liquid at about 20 to 30° C. can be prepared and stored for long periods of time, anhydrides which are solid at room temperature (about 20 to 30° C.) must be heated and mixed in molten form with the accelerator immediately prior to mixing with the epoxy resin in molten form at elevated temperatures in order to provide intimate contact of the curing agent and accelerator with the epoxy resin and thereby to produce a uniformly cured product. The need for keeping the mixture of the anhydride curing agent and the accelerator at elevated temperature when mixing them with the uncured epoxy resin is a disadvantage in many fields, because the pot life of the resin is exceedingly short in the presence of accelerators, at elevated temperatures. The problem becomes more cumbersome when large amounts of resin are cured because it is difficult to mold or otherwise utilize the large volume of resin before it sets to an unmanageable mass. Furthermore, the requirement of preheating the curing composition, the epoxy resin and the accelerator separately, in order to be able to convert them to liquids of low viscosity which will mix together thoroughly, adds to the trouble and cost of the operation and products resulting therefrom.

Certain known mixtures of cyclic dicarboxylic acid anhydrides which are normally solid at room temperature, for example a mixture of 85 parts hexahydrophthalic anhydride and 15 parts tetrahydrophthalic anhydride (by weight) provide compositions which, when properly prepared, remain liquid at room temperature for appreciable periods, due to supercooling, even though such mixtures do not have true melting points below the normal room temperatures. However, such supercooled liquids eventually solidify, and one cannot be certain how long such supercooled mixtures will remain in liquid form. Furthermore, if such mixtures are cooled to freezing temperatures, they crystallize rapidly and the resulting solid masses do not revert to the liquid state on warming to room temperature; that is, they are not freeze-thaw resistant. Consequently, during shipping and storage, especially during the winter, these supercooled liquid mixtures are likely to be exposed to temperatures well below their freezing points, causing them to solidify. Then on warming to room temperature these mixtures will remain heterogeneous and not liquefy, thereby necessitating reheating of the containers to temperatures well above the melting point of the mixtures followed by careful cooling of the resulting melt so as to avoid solidification of the resulting metastable liquid phase. Another disadvantage of such supercooled liquid mixtures is that they require extreme caution in their preparation, since the presence of even minute quantities of solids in such supercooled liquids may cause them to solidify.

It is therefore an object of this invention to provide compositions comprising essentially cyclic anhydrides of polycarboxylic acids in the form of stable homogeneous liquids which are freeze-thaw resistant.

Another object of this invention is to provide compositions comprising essentially a mixture of hexahydrophthalic anhydride, tetrahydrophthalic anhydride and phthalic anhydride in the form of stable homogeneous liquids which when frozen will revert to their original homogeneous liquid state upon warming to about 20°–30° C.

A further object of this invention is to provide a process for preparing such stable homogeneous liquid compositions.

We have discovered that novel mixtures comprising essentially anhydrides of polycarboxylic acids, which mixtures are stable homogeneous liquids at about 20° to 30° C. and remain in homogeneous liquid form at such temperatures for long periods of time (a month or longer), which are freeze-thaw resistant (they revert to their original homogeneous liquid form when solidified by freezing and rewarmed to about 20°–30° C.) and which are especially adapted for use as curing agents for epoxy resins, can be obtained by incorporating, into a mixture of the anhydrides of hexahydrophthalic acid, tetrahydrophthalic acid and phthalic acid, which mixture constitutes a useful curing agent for epoxy resins and is normally heterogeneous at least after being subjected to a freeze-thaw cycle, a small but stabilizing amount of a reaction product of a tertiary amine and a polycarboxylic acid anhydride.

Thus we have discovered that, by incorporating a small amount of a reaction product of a tertiary amine such as benzyldimethylamine or a mixture of tertiary amines with a polycarboxylic acid anhydride, preferably corresponding to at least one of the anhydrides in the mixture to be stabilized, into a mixture comprising about 70–85 percent hexahydrophthalic anhydride, about 10–20 percent tetrahydrophthalic and about 5–10 percent phthalic anhydride, said mixture can be converted from a metastable or heterogeneous mixture which is not free-thaw resistant, to a stable homogeneous liquid composition which remains in homogeneous liquid form at ordinary room temperatures for long periods of time and which, after being exposed to temperatures below its solidification temperature, reverts to said homogeneous liquid form on being warmed to about 20°–30° C., that is, said homogeneous liquid composition retains its fluidity characteristics after being subjected to at least one freeze-thaw cycle. As employed herein, a freeze-thaw cycle consists in holding a 100 gram mass of the composition to be tested at about −10° C. until it becomes solid throughout, then allowing it to warm to room temperature. A composition is considered to have undergone a successful freeze-thaw cycle if it reverts to a completely homogeneous liquid phase on standing for about 24 hours at about 20°–30° C.

In addition to being stable, the liquid anhydride compositions of our invention are readily miscible with epoxy resins at or near ordinary temperatures (about 20°–30° C.), and they yield, after heating to curing temperatures, products having properties comparable in excellence to the properties obtained when the same resins are cured by admixing separately said mixture of anhydrides and said stabilizing amount of tertiary amine with an epoxy resin at a temperature above the melting point of said mixture of anhydrides. The presence of the small stabilizing amount of tertiary amine-anhydride reaction product in the anhydride compositions does not adversely affect their ability to cure epoxy resins. Actually, the presence of the tertiary amine-anhydride reaction product obviates the need for the addition of other accelerators, since the accelerating effect of an amine on the curing ability of anhydrides is not adversely affected by incorporation of the amine in the form of its reaction product with an anhydride in the anhydride mixture. Furthermore, it is much more convenient to mix an epoxy resin and a liquid curing composition of our invention at substantially room temperature rather than to have to preheat the anhydride to an elevated temperature in the presence of the tertiary amine and then add the amine anhydride mixture to the epoxy resin at a temperature sufficient to keep the curing mass in the liquid phase as is done in the conventional processes. By operating at or near room temperature (20°–30° C.), the working life (i.e., "pot life") of the resin mass is increased considerably.

After the epoxy resin has been mixed with a curing composition of our invention, the mixture may be poured in any mold of suitable dimensions, in which it is cured to a hard resinous structure upon heating in the conventional manner. Optionally an additional small amount, generally about 1 percent by weight of resin, tertiary amine or other activator may be added to effect a faster cure.

Surprisingly, the stable anhydride compositions of our invention cannot be derived by the incorporation of primary or secondary amine-anhydride reaction products or mixtures thereof in the anhydride compositions of this invention. For example, when n-hexylamine, a primary amine, is added to a mixture of about 78 parts hexahydrophthalic anhydride, 15 parts tetrahydrophthalic anhydride and 7 parts phthalic anhydride, two distinct and immiscible layers are obtained, either immediately or after only one freeze-thaw cycle. Presumably the primary and secondary amines interact with the anhydrides to form insoluble 2-carboxy carboxamides.

While the mechanism by which the anhydride mixture becomes stabilized is not known with certainty, it is suggested that the stabilizing effect of a tertiary amine-anhydride reaction product may be ascribable to the possibility that such a reaction product is of sufficiently low energy to permit rapid interchange of the amine component of the complex with surrounding anhydride molecules, thereby effectively interfering with proper alignment of the anhydride molecules in a crystal lattice.

The stabilizing tertiary amine-anhydride reaction products may be prepared in a number of ways, usually by the simple admixture of equimolecular quantities of the anhydride and the amine with or without heating, as necessary. The reaction product can be incorporated into the cyclic anhydride compositions in various ways. Thus, a preformed reaction product of a tertiary amine and a polycarboxylic acid anhydride can be mixed with the mixture of cyclic anhydrides to be stabilized while the latter is in liquid form; or the reaction product can be formed in situ as by mixing a suitable tertiary amine with the mixture of cyclic anhydrides in liquid form, for example, by merely mixing together a super-cooled liquid mixture of about 70–85 percent hexahydrophthalic anhydride, about 10–20 percent tetrahydrophthalic anhydride and about 5–10 percent phthalic anhydride, with a suitable small amount of a tertiary amine whereby an amine-anhydride reaction product is formed sufficient to render the mixture homogeneous and freeze-thaw resistant.

The invention accordingly comprises the compositions of matter possessing the characteristics, properties and the relation of constituents which will be exemplified in the compositions hereinafter described, and the several steps and their relation which will be exemplified in the processes hereinafter described. The scope of the invention will be indicated in the claims.

Various cyclic anhydrides, or mixtures of cyclic anhydrides, are useful as additional components of the compositions of the present invention and in the reaction with the tertiary amines herein to form the stabilizing agent. (As employed herein, including the claims, the term "cyclic anhydride" denotes and includes anhydrides that are derived from a single molecule of polycarboxylic acid, so that the anhydride group forms at least one heterocyclic nucleus with the remainder of the molecule of the polycarboxylic acid). They comprise anhydrides derived from aliphatic or cycloaliphatic polycarboxylic acids as well as from aromatic and heterocyclic polycarboxylic acids having at least two vicinal carboxy groups, including those which are saturated and those which are unsaturated. They include anhydrides derived from polycarboxylic acids which contain two or more sets of carboxy groups capable of forming cyclic anhydrides as well as those derived from polycarboxylic acids which contain only a single set of carboxy groups capable of forming a cyclic anhydride, all of which also may contain other carboxy groups. Examples of cyclic anhydrides which may be successfully combined in minor amounts with the liquid anhydride compositions of our invention, as such or suitably in the form of their tertiary amine reaction products are the anhydrides of the following polycarboxylic acids:

dihydrophthalic acid
pyromellitic acid
succinic acid
dodecenyl-succinic acid
chlorosuccinic acid
maleic acid
chloromaleic acid
6-ethyl-4-cyclohexene-1,2-dicarboxylic acid
3,6-dimethyl-4-cyclohexene-1,2-dicarboxylic acid
6-butyl-3,5-cyclohexadiene-1,2-dicarboxylic acid
dioctylsuccinic acid
nonadecadienylsuccinic acid
3-methyl-1,2,3,6-tetrahydrophthalic acid
bicyclo[2,2,1]hept-5-ene-2,3-dicarboxylic acid, and
methylbicyclo[2,2,1]hept-5-ene-2,3-dicarboxylic acid as well as mixtures of said anhydrides.

Generally up to about 7 percent of another anhydride can be added to the stabilized hexahydrophthalic, tetrahydrophthalic and phthalic anhydride compositions of our invention without adversely affecting their stability or homogeneity.

The tertiary amine-anhydride complexes employed as stabilizers in the compositions of the present invention comprise the various amine reaction products of polycarboxylic acid anhydrides, and especially of the polycarboxylic acid anhydrides which comprise the anhydride mixtures of the compositions. Typical amines suitable for use in this invention are trialkyl amines such as triethylamine, triisopropylamine and tributylamine, N,N-dialkylanilines such as N,N-dimethylaniline, N,N-diethylaniline and N,N-diisopropyl-p-toluidine, N-alkyldiphenylamines such as N-methyldiphenylamine, N-(2-chloroethyl)diphenylamine and N-butyldicumylamine, triarylamines such as triphenylamine and tri-4-tolylamine, aralkyldialkylamines such as benzyldimethylamine, 4-chlorobenzyldiethylamine and 4-anisidyldibutylamine, dialkylaminoalkylphenols such as 2,4-bis(dimethylaminomethyl)phenol, 2,6-bis(diethylaminomethylphenol) and 2,4-bis(dimethylaminoethyl)phenol, pyridine, substituted pyridines such as 2,6-dimethylpyridine, 4-methylpyridine, 2-methylpyridine and collidine, imidazoles such as 2-ethyl-4-methylimidazole and 2-isopropyl-4-methyl imidazole, and the like and mixtures thereof.

It is to be understood that the nature of the amine can vary widely, provided that the amine is of the tertiary type and provided that it does not in any way adversely affect the curing properties of the anhydride mixtures or the properties of the cured epoxy resins.

The proportion of tertiary amine-anhydride reaction product employed relative to the mixtures of cyclic anhydrides can be varied somewhat, depending upon the composition of the anhydride mixture to be stabilized and the purpose for which it is to be employed. In general, the amount of tertiary amine-anhydride reaction product required is small. It is preferred to employ only sufficient amounts of said reaction product to accomplish the desired stabilization, since excessive amounts will substantially reduce resin pot life, even at room temperature. Furthermore, excessive concentrations of said reaction products lead to the separation of solid residues from the curing compositions.

Thus, for the preparation of the liquid compositions of our invention, amounts of tertiary amine-anhydride reaction product corresponding to about 0.2 to about 5.0 percent by weight of the anhydride mixture are suitable. Amounts of said reaction products corresponding to from about 1 to about 3 percent by weight of the anhydride mixture are preferred.

The following examples describe specific embodiments of the invention and illustrate the best method contemplated for carrying it out; but they are not to be interpreted as limiting the invention to all details thereof, since changes can be made without departing from the scope of the invention. The temperatures are in degrees centigrade and the parts and percentages are by weight.

*Example 1*

Part A.—Approximately 170 parts of hexahydrophthalic anhydride is heated to about 60° C. and cooled by means of water to about 25–30° C. About 135 parts of benzyldimethylamine is added dropwise while maintaining the reaction temperature at about 25–30° C. The resulting product is obtained in the form of a viscous liquid.

Part B.—A mixture of 78 parts hexahydrophthalic anhydride, 15 parts tetrahydrophthalic anhydride and 7 parts phthalic anhydride flakes and 5 parts of the tertiary amine-anhydride product prepared as described in part A of this example are stirred and heated at about 60° C. until a completely homogeneous liquid product is obtained. On cooling to room temperature, the liquid product does not solidify and remains homogeneous on standing for long periods of time. When the product is kept at about −10° C. for 18 hours and the frozen mass is then allowed to warm to 20° C., a homogeneous liquid product is again obtained, which remains in homogeneous liquid form on standing at room temperatures for long periods of time.

*Example 2*

A mixture of 78 parts hexahydrophthalic anhydride, 15 parts tetrahydrophthalic anhydride and 7 parts phthalic anhydride flakes is heated at 60°–65° C. for one hour, with efficient agitation. The mixture is cooled by means of a water bath to 25°–27° C. and 2 parts benzyldimethylamine is added immediately, dropwise so that the reaction mixture temperatures does not exceed 25°–30° C. whereby a reaction product of a portion of the anhydride mixture and the amine forms in situ. There is obtained a liquid product, which does not solidify on standing at 20°–30° C. and which, when kept at about −10° C. for 18 hours and then allowed to warm to about 20°–30° C., yields a homogeneous liquid product which remains indefinitely in homogeneous liquid form, on standing at about 20°–30° C.

The following examples illustrate additional homogeneous, stable liquid compositions obtained by employing the following components in the process of Example 2 in the amounts set out in the following Table 1. In each case a homogeneous, liquid composition is obtained which is freeze-thaw resistant and which remains homogeneous when left standing at room temperatures for long periods of time. The stabilized homogeneous liquid anhydrides of the present invention can be subjected repeatedly to freeze-thaw cycles at various intervals between cycles, without causing a breakdown of the homogeneity of the liquid compositions. Thus the compositions disclosed in the above and following specific examples still retain their liquid homogeneity after standing at room temperature for longer than a month, even though they have been subjected to as many as 5, 8 or 10 freeze-thaw cycles over the course of several weeks.

TABLE 1

| Ex. No. | Anhydride Components,* parts | Amine Component, parts |
|---|---|---|
| 3 | HHPA 78, THPA 15, PAA 7. | Tris(dimethylaminomethyl)phenol 2. |
| 4 | HHPA 78, THPA 15. | Dimethylaminomethylphenol 2. |
| 5 | HHPA 78, THPA 15, PAA 7. | 2-ethyl-4-methylimidazole 2. |
| 6 | HHPA 78, THPA 15, PAA 7. | 2,6-dimethylpyridine 2. |

*HHPA denotes hexahydrophthalic anhydride; THPA denotes tetrahydrophthalic anhydride; PAA denotes phthalic anhydride.

When the above examples are repeated preforming the amine-anhydride reaction product as in Example 1, the compositions obtained are equally as freeze-thaw resistant and retain their homogeneity after standing at room temperature for long periods.

*Example 7*

As illustrative of the fact that the inclusion of tertiary amine-anhydride reaction products in the compositions of the present invention does not adversely affect the curing ability of the anhydride mixture or the accelerator ability of the tertiary amines present in the complex, a sample of commercial epoxy resin ("Epon Resin 828") is cured with the composition set out in Example 1 and an identical sample is cured conventionally by combining the anhydride components of Example 1, benzyldimethylamine and the epoxy resin at a temperature above the melting point of the anhydride components so as to insure intimate contact of the resin with the curing agent and the accelerator, in the following manner:

Part A.—One hundred parts of the epoxy resin are mixed with 75 parts of the homogeneous liquid anhydride composition prepared by the process of Example 1. The mixture is heated for 3 hours at 90° C., then for 4 hours at 150° C. and finally for 4 hours at 200° C. to effect curing.

Part B.—One hundred parts of the epoxy resin are mixed with 74 parts of a solid anhydride mixture containing 78 percent by weight hexahydrophthalic anhydride, 15 percent by weight tetrahydrophthalic anhydride and 7 percent by weight phthalic anhydride. The combined epoxy resin anhydride mixture is heated until homogeneous (about 80° to 100° C.) and treated with 2 parts benzyldimethylamine. The reaction mixture is cured as outlined in part A, i.e. for 3 hours at 90° C., 4 hours at 150° C. and finally 4 hours at 200° C.

In each case the cured epoxy resin has the following properties:

Heat deflection temperature (as measured by ASTM D–648 method) _____ 122° C.
Flexural strength at yield _____ About 10,800 p.s.i.
Flexural strength at break _____ About 18,700 p.s.i.
Tangent modulus of elasticity ____ About $4.57 \times 10^5$ p.s.i.

We claim:
1. A stable composition which is a homogeneous liquid at a temperature of about 20° to 30° C. and freeze-thaw resistant comprising essentially a mixture of hexahydrophthalic anhydride, tetrahydrophthalic anhydride and phthalic anhydride, which mixture is normally heterogeneous at least after being subjected to a freeze-thaw cycle and is capable of acting as a curing agent for epoxy resins, and as a stabilizing agent for said mixture, a small amount of the reaction product of about equimolecular quantities of a tertiary amine and a polycarboxylic acid anhydride, the amount of said reaction product being about 0.2 to about 5.0 percent of the weight of the mixture of anhydrides.

2. A composition as claimed in claim 2 in which the mixture of anhydrides consists essentially of a mixture of about 70 to about 85 percent hexahydrophthalic anhydride, about 10–20 percent tetrahydrophthalic anhydride and about 5–10 percent phthalic anhydride, by weight.

3. A composition as claimed in claim 3 in which the anhydride mixture contains up to about 7 percent by weight of at least one other cyclic anhydride of a polycarboxylic acid.

4. A composition as claimed in claim 2 wherein said reaction product is derived from the reaction of a tertiary amine selected from the group consisting of benzyldimethylamine, tri (dimethylaminomethyl) - phenol, dimethylaminomethyl phenol, 2-ethyl-4 - methylimidazole, 2,6-dimethylpyridine and mixtures thereof, with a polycarboxylic acid anhydride selected from the group consisting of dihydrophthalic, pyromellitic, succinic, phthalic, hexahydrophthalic and tetrahydrophthalic anhydrides and mixtures thereof.

5. A composition as claimed in claim 2 wherein the stabilizing agent is present in an amount of from about 1 to 3 percent of the weight of the mixture of anhydrides.

6. A composition as claimed in claim 2 wherein said stabilizing agent is the reaction product of benzyldimethylamine and a mixture of hexahydrophthalic acid anhydride, tetrahydrophthalic acid anhydride and phthalic anhydride.

7. A process for the preparation of a stable, freeze-thaw resistant homogenous liquid polycarboxylic anhydride composition which comprises incorporating in a mixture of hexahydrophthalic anhydride, tetrahydrophthalic anhydride and phthalic anhydride, which mixture is normally heterogeneous at least after being subjected to a freeze-thaw cycle and is capable of acting as a curing agent for epoxy resins, a small amount of the reaction product of about equimolecular quantities of a tertiary amine and a polycarboxylic acid anhydride, the amount of said reaction product being about 0.2 to about 5.0 percent of the weight of the mixture of anhydrides.

8. A process as claimed in claim 7 wherein the amount of said reaction product present is from about 1 to about 3 percent of the weight of the anhydride mixture.

9. A process as claimed in claim 7 wherein the stabilizing agent is the reaction product of equimolecular quantities of benzyldimethyl amine and a mixture of hexahydrophthalic anhydride, tetrahydrophthalic anhydride and phthalic anhydride.

10. A process for the preparation of a stable, freeze-thaw resistant homogeneous liquid dicarboxylic acid anhydride composition which comprises heating a liquid mixture of 70 to 85 parts of hexahydrophthalic anhydride, 10 to 20 parts of tetrahydrophthalic anhydride and 5–10 parts of phthalic anhydride, by weight, at a temperature of about 60 to 65° C., cooling the mixture to a temperature of about 25–30° C., adding about 2 parts of the reaction product of equimolar quantities of benzyldimethylamine and a mixture of tetrahydrophthalic anhydride, hexahydrophthalic anhydride and phthalic anhydride, by weight at room temperature, and maintaining the reaction mixture at the latter temperature whereby a homogeneous liquid mixture is formed.

11. A process as claimed in claim 7 wherein said reaction product is derived from the reaction of a tertiary amine selected from the group consisting of benzyldimethylamine, tri (dimethylaminomethyl) - phenol, dimethylaminomethyl phenol, 2-ethyl-4 - methylimidazole, 2,6-dimethylpyridine and mixtures thereof, with a polycarboxylic acid anhydride selected from the group consisting or dihydrophthalic, pyromellitic, succinic, phthalic, hexahydrophthalic and tetrahydrophthalic anhydrides and mixtures thereof.

No references cited.

NICHOLAS S. RIZZO, *Primary Examiner.*

UNITED STATES PATENT OFFICE
CERTIFICATE OF CORRECTION

Patent No. 3,341,555 September 12, 1967

George S. Wooster et al.

It is hereby certified that error appears in the above numbered patent requiring correction and that the said Letters Patent should read as corrected below.

Column 3, line 6, after "ordinary" insert -- room --; column 7, lines 15, 25, 35 and 38, for the claim reference numeral "2", each occurrence, read -- 1 --; line 21, for the claim reference numeral "3" read -- 2 --.

Signed and sealed this 1st day of October 1968.

(SEAL)
Attest:

Edward M. Fletcher, Jr.
Attesting Officer

EDWARD J. BRENNER
Commissioner of Patents